R. RICHTER.
ELECTRICAL EQUALIZING SYSTEM.
APPLICATION FILED MAY 16, 1910.

977,328.

Patented Nov. 29, 1910.

WITNESSES:
Fred H. Miller
B. B. Hines

INVENTOR
Rudolf Richter
BY
Wesley G. Carr
ATTORNEY

UNITED STATES PATENT OFFICE.

RUDOLF RICHTER, OF GRÜNAU, NEAR BERLIN, GERMANY.

ELECTRICAL EQUALIZING SYSTEM.

977,328.  Specification of Letters Patent.  Patented Nov. 29, 1910.

Application filed May 16, 1910. Serial No. 561,703.

*To all whom it may concern:*

Be it known that I, RUDOLF RICHTER, a subject of the Emperor of Germany, and a resident of Grünau, Mark, near Berlin, Germany, have invented a new and useful Improvement in Electrical Equalizing Systems, of which the following is a specification.

My invention relates to systems of electrical distribution and particularly to means for equalizing the loads upon alternating current circuits.

Various means have been proposed and devised for securing a like or similar object to that contemplated by the present invention, among which is the use of a means for mechanically shifting the stationary member of a synchronous alternating current generator which is connected to the line in multiple circuit relation to the main generator, in order to provide the desired equalization of load on the latter. Such an adjustment has not proved satisfactory in practice, on account of the difficulty in adjusting the large mass of material and the slowness with which adjustment may be effected.

It is the purpose of my present invention to secure the desired result in a m advantageous manner and more expeditiously, by adjusting or shifting the magnetic axis of the field magnet of a synchronous dynamo-electric machine the armature of which is connected to the circuit to be regulated. The shifting of the magnetic axis of the field magnet of the machine may be accomplished by any one of a variety of means, one of the elements of which is a commutating device having brushes that are adjustable with reference to the commutator segments in accordance with variations of the load on the circuit to be regulated.

Figure 1:
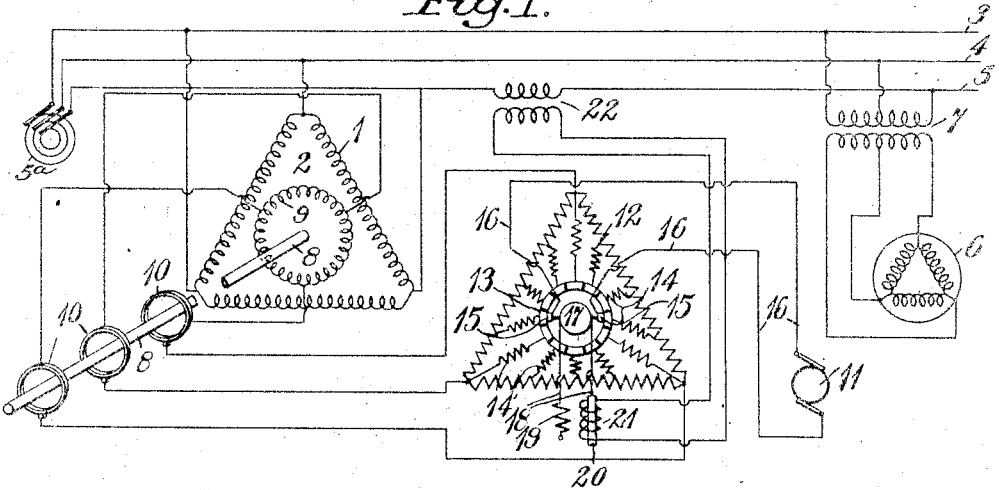
Figure 2:
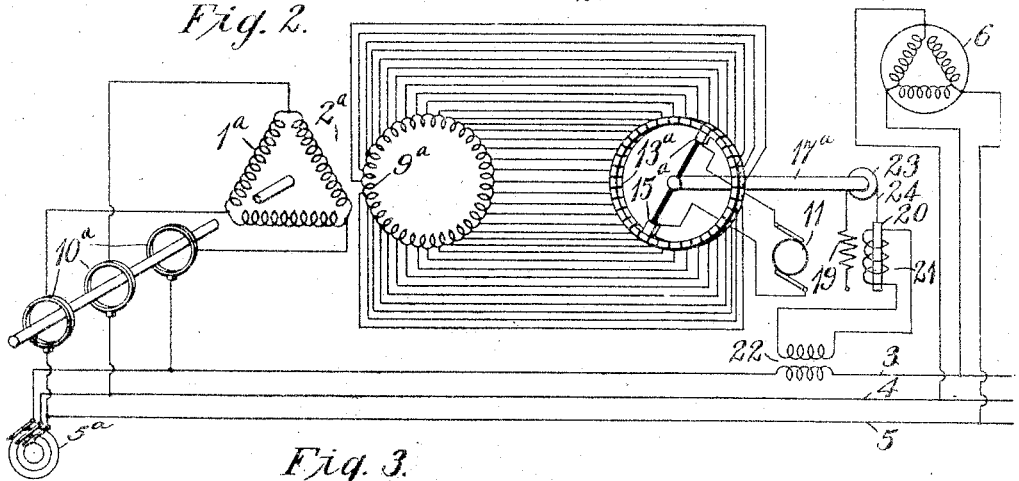
Figure 3:
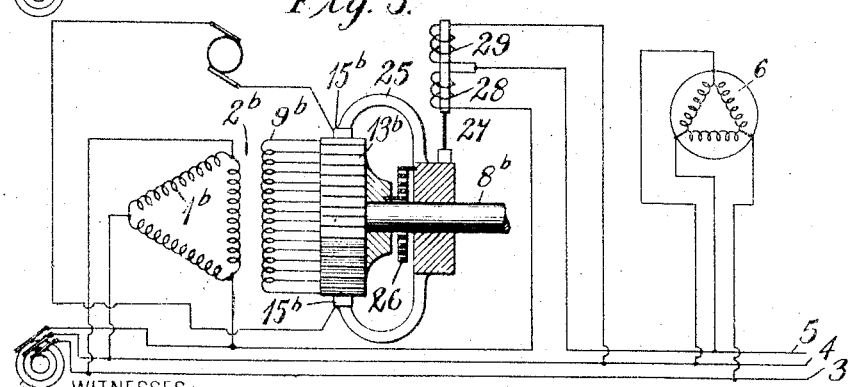

In the accompanying drawing, Figure 1 is a diagram of an alternating current system of distribution equipped with my invention. Fig. 2 is a diagram of a system embodying a modification of the invention, and Fig. 3 is a diagram of another system embodying a still further modification.

In the system shown in Fig. 1, the stationary armature 1 of a three-phase generator 2 is connected to a three-phase work circuit 3—4—5, which may be supplied from any suitable source of energy such as main generator 5ª and is provided with a load, here indicated as a three-phase induction motor 6 having a connection to the line, through a three-phase transformer 7. The shaft 8 of the rotary field magnet 9 of the generator 2 is provided with three collector rings 10, which are connected to equi-distant points in the field magnet winding. The exciting current, which is provided by a suitable exciting generator 11, is supplied to the collector rings 10, through a resistance 12, a plurality of points in which are connected to the segments of a commutator cylinder 13, through resistance leads 14. The resistance leads 14 are so proportioned and the connections between the commutator cylinder segments and the resistance 12 are so spaced as to provide the most uniform exciter current. The brushes 15 which engage the commutator segments, and to which the exciter terminals are connected by means of conductors 16, are mounted upon a shaft 17, which may be rotatably adjusted, either by hand or automatically, in accordance with variations in load on the circuit 3—4—5. In case of automatic adjustment, any suitable motor device or mechanism may be employed, that here shown being a cord or belt 18 one end of which is attached to a stationary support, by means of a spring 19, and the other end of which is connected to the core 20 of a solenoid 21 that receives current from the secondary winding of a transformer 22, the primary winding of which is connected in the conductor 5 of the work circuit.

With the arrangement above described, when the brushes are stationary with relation to the commutator cylinder, the machine operates as an ordinary synchronous generator. As the brushes are shifted in the one direction or the other, the magnetic axis of the field magnet 9 will be shifted and the machine will either deliver energy to the line or will store energy as a fly-wheel, according to the direction of movement of the brushes.

It is to be understood that, if two alternating current generators are connected in multiple circuit relation and the phase of one is displaced relative to that of the other, by shifting its magnetic axis, or otherwise, the load will be unequally divided between them. In accordance with this principle of operation, I employ a synchronous alternating current machine as an equalizer which, by reason of its mass, acts as a generator whenever a load is suddenly applied to the line. Furthermore, since the machine is connected in multiple circuit relation to the main generator, by making the shifting of its magnetic axis and its phase displacement automatically responsive to the load on the line, the load on the main generator is automatically equalized.

In the embodiment of the invention which I have shown and described, a smooth and gradual adjustment of the magnetic axis of the field magnet may be effected, without tapping a large number of points in its winding, by reason of the resistance coils 12 and 14, the use of a direct current type of winding and a careful proportioning and arrangement of the poles. The commutation is satisfactory, since the electromotive-force of the exciting current is low and no disturbing electromotive-force occurs in the short-circuited windings.

As indicated in Fig. 2 of the drawings, the armature $1^a$ of the dynamo-electric machine $2^a$ is rotatable, and, therefore, supplies energy to the work circuit 3—4—5, through collector rings $10^a$, to the load represented at 6. The winding of the stationary field magnet $9^a$ is connected, at various points, to the segments of a commutator cylinder $13^a$, which is also stationary, and brushes $15^a$ are mounted upon a rotatable shaft $17^a$, to engage with the commutator, the brushes being connected to an exciter 11, substantially as indicated in Fig. 1. In this modification, the shaft $17^a$, on which the brushes are mounted, is belted to a drum 23, over which operates a cord or belt 24, one end of which is connected to a stationary support by means of a spring 19 the other end of which is connected to the core 20 of a solenoid 21. The solenoid itself is connected to the stationary winding of a series transformer 22, the primary of which is in the work circuit conductor 3. The adjustment of the magnetic axis of the field magnet is effected automatically, in accordance with changes in the load on the work circuit, in substantially the same manner as in the system shown in Fig. 1.

In Fig. 3 is shown a dynamo-electric machine $2^b$ having a stationary armature $1^b$ for supplying the work circuit 3—4—5 and a rotatable field magnet $9^b$, the commutator cylinder $13^b$ for which is mounted on the shaft $8^b$ of the field magnet structure. In this modification, the commutator cylinder $13^b$ and the winding of the field magnet $9^b$ are shown in side elevation, for convenience, but it is to be understood that the said winding is of the closed type and differs from the winding of the field magnet 9 of Fig. 1 and the winding of the field magnet $9^a$ of Fig. 2 only in being made a part of the rotatable member of the machine. The brushes $15^b$ for engagement with the commutator cylinder $13^b$ are supported by a brush-holder 25 which is loosely mounted upon the shaft $8^b$. The holder 25 is connected to the commutator cylinder $13^b$ by means of a spiral spring 26, which permits independent movement between the said parts. A brake device 27 is shown as engaging the brush-holder cylinder, and this is controlled by means of two opposing coils 28 and 29, one of which is a current coil connected in series with the conductor 5 of the work circuit, and the other a voltage coil which is connected across the conductors 4 and 5 of such circuit. Since the commutator cylinder $13^b$ is keyed to the shaft $8^b$ and the brush holder 25 is loosely mounted upon said shaft, rotation of the brush holder is effected by reason of the spring 26 and the friction between the brushes $15^b$ and the commutator cylinder. In order that the rotative adjustment of the brushes with reference to the commutator cylinder, which is permitted by the above-mentioned connections, may effect such adjustment of the magnetic axis of the field magnet $9^b$ as corresponds to the load upon the circuit to which the armature $1^b$ is connected, I provide the brake 27. Assuming that the voltage of the circuit 3—4—5 is substantially constant, the pull exerted by the coil 29 is also constant and tends to release the brake 27. The coil 28 acts in opposition to the coil 29 and tends to apply the brake 27. If the pull exerted by the coil 28 is overcome by the coil 29, the brake is released and the brushes $15^b$ and the commutator cylinder $13^b$ rotate together. If, however, the current coil predominates, the brake is applied and a greater or less adjustment of the brushes relative to the cylinder is effected in opposition to the spring 26. It is therefore evident that the same result is accomplished in each of the three systems illustrated.

Various other means may be employed, if desired, for automatically shifting the magnetic axis of the field magnet of the generator, and I, therefore, desire it to be understood that my invention is not limited to any specific device or apparatus, except in so far as limitations are imposed by the prior art and are definitely specified in the appended claims.

I claim as my invention:

1. The combination with an alternating current circuit, and a dynamo-electric machine connected thereto, one of the coil-bearing members of which rotates continuously when in service, of an automatically operating means for shifting the magnetic axis of one of said members in accordance with the load variations on said circuit.

2. The combination with an alternating current circuit, and a synchronous dynamo-electric machine connected thereto, of means for shifting the magnetic axis of one of the members of said machine in accordance with the load variations on said circuit.

3. The combination with a work circuit having a variable load, of a synchronous dynamo-electric machine having its armature connected to said circuit, and means for so supplying an exciting current to the field magnet of said machine as to shift the magnetic axis of the field magnet in accordance with the load variations.

4. The combination with a work circuit having a variable load, of a dynamo-electric machine having its armature connected to said circuit, an exciter, a set of commutator segments and a pair of brushes interposed between said exciter and the field magnet winding of the dynamo-electric machine, and means for shifting the commutator brushes as the load on the circuit varies.

5. The combination with an alternating current work circuit and a synchronous dynamo-electric machine having its armature connected to said circuit, of an exciter, a set of commutator segments and a pair of brushes interposed between the exciter and the field magnet winding of said dynamo-electric machine, and means for effecting relative adjustment between said set of segments and said brushes, said means embodying an operating coil that is energized from the work circuit, whereby the magnetic axis of the field magnet of said dynamo-electric machine is shifted in accordance with load variations on the work circuit.

In testimony whereof, I have hereunto subscribed my name this 27 day of April, 1910.

RUDOLF RICHTER.

Witnesses:
  HENRY HASPER,
  WOLDEMAR HAUPT.